US012681581B2

(12) United States Patent
Breitschaft et al.

(10) Patent No.: US 12,681,581 B2
(45) Date of Patent: Jul. 14, 2026

(54) CONTROL DEVICE AND METHOD FOR ACTIVATING AN ACTIVE HAPTICS OPERATOR CONTROL ELEMENT FOR A MOTOR VEHICLE

(71) Applicant: Bayerische Motoren Werke Aktiengesellschaft, Munich (DE)

(72) Inventors: Stefan Breitschaft, Nabburg (DE); Thomas Hilger, Iffeldorf (DE); Christian Knoll, Munich (DE); Stephan Mueller, Munich (DE); Hannes Trapp, Munich (DE)

(73) Assignee: Bayerische Motoren Werke Aktiengesellschaft, Munich (DE)

( * ) Notice: Subject to any disclaimer, the term of this patent is extended or adjusted under 35 U.S.C. 154(b) by 1 day.

(21) Appl. No.: 18/912,778

(22) Filed: Oct. 11, 2024

(65) Prior Publication Data

US 2025/0130644 A1     Apr. 24, 2025

(30) Foreign Application Priority Data

Oct. 20, 2023     (DE) ..................... 10 2023 128 970.5

(51) Int. Cl.
*G06F 3/01* (2006.01)
*B62D 1/04* (2006.01)

(52) U.S. Cl.
CPC .............. *G06F 3/016* (2013.01); *B62D 1/046* (2013.01)

(58) Field of Classification Search
CPC ......... G06F 3/016; B62D 1/046; B60K 35/10; B60K 2360/1446; B60W 50/16
See application file for complete search history.

(56) References Cited

U.S. PATENT DOCUMENTS

| | | | | |
|---|---|---|---|---|
| 9,063,570 | B2 * | 6/2015 | Weddle ................... | G06F 3/016 |
| 10,681,205 | B1 * | 6/2020 | Xu ........................... | G06F 3/016 |
| 2009/0085720 | A1 * | 4/2009 | Kurpinski ............. | B60R 25/246 |
| | | | | 340/5.64 |
| 2012/0007724 | A1 * | 1/2012 | Murakami ............. | G08C 19/12 |
| | | | | 340/12.5 |

(Continued)

FOREIGN PATENT DOCUMENTS

| | | |
|---|---|---|
| DE | 10 2009 048 823 A1 | 4/2011 |
| DE | 10 2015 209 590 A1 | 7/2016 |
| DE | 10 2017 127 231 A1 | 5/2019 |

OTHER PUBLICATIONS

German-language Office Action issued in German Application No. 10 2023 128 970.5 dated Jun. 3, 2024 (10 pages).

*Primary Examiner* — Curtis J King

(74) *Attorney, Agent, or Firm* — Crowell & Moring LLP

(57) ABSTRACT

A control device for activating an active haptics operator control element for a motor vehicle is configured to determine whether the operator control element is being operated with a short press or a long press. The control device is configured so as, if it has been determined that the operator control element has been operated with a short press, to determine whether the operator control element has an assigned long-press function that is performable after the operator control element has been operated with a long press, and to activate the operator control element to output an active haptic feedback if it has been determined that the operator control element has an assigned long-press function.

10 Claims, 6 Drawing Sheets

(56)  References Cited

U.S. PATENT DOCUMENTS

| | | | | |
|---|---|---|---|---|
| 2012/0111709 | A1* | 5/2012 | Senzaki | H01H 13/86 |
| | | | | 200/341 |
| 2013/0016042 | A1* | 1/2013 | Makinen | G06F 3/04886 |
| | | | | 345/173 |
| 2013/0154972 | A1* | 6/2013 | Takeuchi | G06F 3/016 |
| | | | | 345/173 |
| 2014/0002346 | A1* | 1/2014 | Weddle | G06F 3/016 |
| | | | | 345/156 |
| 2019/0007538 | A1* | 1/2019 | Fariborzi | G06F 3/016 |
| 2019/0033969 | A1* | 1/2019 | Gush | B64C 13/04 |
| 2019/0130898 | A1* | 5/2019 | Tzirkel-Hancock | G10L 15/22 |
| 2019/0152388 | A1 | 5/2019 | Frey et al. | |
| 2019/0339804 | A1* | 11/2019 | Gleeson | G06F 3/0482 |
| 2020/0285321 | A1* | 9/2020 | Ma | G06F 3/017 |
| 2021/0004116 | A1* | 1/2021 | Nakai | G06F 3/03547 |
| 2021/0398402 | A1* | 12/2021 | Richards | G08B 6/00 |
| 2022/0081093 | A1* | 3/2022 | Miyaki | B63B 79/40 |
| 2022/0161757 | A1* | 5/2022 | Zhang | G07C 9/00182 |
| 2022/0332303 | A1* | 10/2022 | Bernatchez | B60W 10/08 |
| 2023/0249685 | A1* | 8/2023 | Jeon | B60W 50/085 |
| | | | | 701/96 |
| 2024/0059147 | A1* | 2/2024 | Kozono | G06F 3/04842 |
| 2025/0001860 | A1* | 1/2025 | Velusamy | B60Q 3/16 |

* cited by examiner

CONTROL DEVICE AND METHOD FOR ACTIVATING AN ACTIVE HAPTICS OPERATOR CONTROL ELEMENT FOR A MOTOR VEHICLE

CROSS REFERENCE TO RELATED APPLICATION

This application claims priority under 35 U.S.C. § 119 from German Patent Application No. DE 10 2023 128 970.5, filed Oct. 20, 2023, the entire disclosure of which is herein expressly incorporated by reference.

BACKGROUND AND SUMMARY

The present disclosure relates to a control device for activating an active haptics operator control element for a motor vehicle, an active haptics operator control unit that comprises the control device, a motor vehicle that comprises the control device, and/or a method for activating an active haptics operator control element for a motor vehicle. Additionally, or alternatively, a computer program is provided that comprises commands that, when the program is executed by a computer, cause said computer to carry out at least part of the method. Additionally, or alternatively, a computer-readable medium is provided that comprises commands that, when the commands are executed by a computer, cause said computer to carry out at least part of the method. The invention therefore lies in the field of operator control elements for motor vehicles.

Operator control elements are conventionally manifested as individually suspended and guided pushbutton switches. Control feedback is provided purely mechanically and is dependent on the mechanical elements used, such as for instance springs and silicone domes, etc. Pressing a key accordingly always results in a haptic control feedback, even if the function associated with the key is not usable, such as for example in the case of a non-functional "Telephone" key that may sometimes, including for reasons of variant minimization, be installed in cars not equipped with a telephone connection. Moreover, operator control units having plates that are suspended so as to be able to be pressed and that accommodate multiple buttons are known in the prior art. The position of the finger on the plate is evaluated and the relevant function stored at the selected location is initiated. In this case too, the control feedback is provided purely mechanically and therefore irrespective of whether or not the function is performable.

Furthermore, keys having a long-press function are known, i.e. a function is performed only when the respective key has been operated for a specific length of time. However, the availability and functionality of a long-press function must first be learned by a user (through recommendation, instructions for use, inadvertent false initiation, active searching, etc.), and so many long-press functions often remain undiscovered over the entire period of product use even though there might be a need to use the functions.

Moreover, multifunction operator control devices with active haptics are also known in the prior art and described in DE 10 2017 127 231 A1, for example.

Against the background of this prior art, the object of present disclosure is to provide a device and/or a method that are each suitable for enriching the prior art, e.g. providing improved operator control units and/or improved provision of haptic feedbacks for operator control elements. One specific form of the disclosure can achieve the object of providing freedom of design for haptic feedbacks from operator control elements.

The object is achieved by the features of the independent claims. Each of the dependent claims contains optional developments of the disclosure.

Accordingly, the object is achieved by a control device for activating an active haptics operator control element for a motor vehicle.

The control device is configured to determine whether the operator control element is being (or has been) operated with a short press or a long press.

The control device is configured so as, if it has been determined that the operator control element has been operated with a short press, to determine whether the operator control element has an assigned long-press function that is performable after the operator control element has been operated with a long press, and to activate the operator control element to output an active haptic feedback if it has been determined that the operator control element has an assigned long-press function.

"Active haptic" can be understood to mean that a haptic feedback is provided not, or at least not exclusively, by passive mechanical elements, such as for instance return springs and/or silicone domes, but rather by an active actuator that can be activated as appropriate. In other words, providing an active haptic feedback can require provision of an actuator in the operator control element and suitable activation for the actuator. By way of example, the actuator can comprise or be in the form of a piezoelectric actuator. Alternatively or additionally, the actuator can comprise other standard actuator types, e.g. solenoids and/or voice coils.

An active haptic feedback may be a haptically perceptible event that can be output to the user. In particular, operation of the operator control element can result in a haptic feedback being output that can be used to identify successful operation of the operator control element, e.g. the operating time having been too short to perform the (long-press) function, however. The haptic feedback can optionally comprise a vibration, an impulse, a vibration pattern and/or a deflection. The haptic feedback can optionally be accompanied by an acoustic feedback, although this is not absolutely necessary.

Operation of the operator control element may be proper performance of a switching process using the operator control element. If the operator control element is in the form of a pushbutton, operation can consist in pressing the pushbutton beyond some predetermined pressure point. If the operator control element is in the form of a rocker switch, operation can optionally consist in a rocking movement beyond some predetermined threshold.

The determination of operation of the operator control element can optionally comprise determining that the operator control element is touched. This may be advantageous in particular for operator control elements that have a touch pad, for instance. In this scenario, the determination of operation of the operator control element can optionally comprise determining a position at which the operator control element has been touched. Depending on the position of the touch, it is then possible to evaluate whether or not the operator control element has been operated. As such, it is possible, for instance, to determine whether the operator control element has been touched at the intended location, whether the operator control element has or had an assigned function at the time of the touch, and whether a predetermined force threshold was exceeded during the touch in order to be regarded as operation of the operator control element.

"Short press" and "long press" should be understood to mean operation of the operator control element with different operating times, the operator control element being, or having been, operated with a shorter operating time in the event of a short press than in the event of a long press. As such, the operator control element may be being operated with a long press if a (continuous) operating time of the operator control element has reached a predefined minimum operating time.

An operating time in this scenario is a length of time for which the operator control element is operated, e.g. a length of time for which an operator control element in the form of a pushbutton is pressed, a duration of a rocking movement of an operator control element in the form of a rocker switch and/or a length of time for which an operator control element that has a touchpad is touched. By way of example, the operating time can correspond to a length of time for which a predetermined (switching) threshold is (continuously) exceeded by operation of the operator control element. The minimum operating time may be a lower threshold that needs to be reached for the operating time.

The operator control element being able to have an assigned function, or long-press function, means that operation of the operator control element signals a user input calling for performance of a function connected to the operator control element. It is also possible for an operator control element to have no assigned function, or long-press function. Alternatively or additionally, an operator control element can have an assigned function only intermittently or can have different assigned functions, or long-press functions, at different times.

The operator control element and/or the operator control unit may optionally be formed in a steering wheel of the motor vehicle. The present disclosure is not limited to this, however, but rather can be used e.g. with any form of direct screen control and remote screen control, but also with all possible active haptics operator control elements without a screen.

The function, or long-press function, being able to be performable means that operating the operator control element results in performance of the function, e.g. inside the motor vehicle. In this scenario, it is conceivable for one or more, e.g. technical, conditions to need to be met in addition to operation of the operator control element, the check on these conditions being initiated e.g. by operation of the operator control element. One of these conditions may be, or it is possible to check in addition to these conditions, that the function can be performed correctly, i.e. there are no technical faults e.g. in the system responsible for performing the function. It is therefore possible for the operator control element to have an associated function (or multiple functions) that cannot be performed, however. Conversely, there may be no associated performable function if there is no associated function or there is an associated function that is not performable, however.

The performability of a function that is referred to, or regarded, as a long-press function is (furthermore) linked to a long press of the operator control element, i.e. the function is performable, or is performed, only when the operator control element has been operated with a long press (e.g. for a minimum operating time). The long press (e.g. operation for a minimum operating time) is therefore a condition that needs to be met, e.g. irrespective of technical aspects of the system of the motor vehicle responsible, or equipped, for performing the function. The system may therefore be technically capable of performing the function, but the operator control element needs to be operated for long enough for the system to be activated by the control device in order to perform the function. The long press, or the minimum operating time, may therefore be a condition that is predefined by the control device and e.g. is stored in a memory (e.g. of the control device).

An active haptic feedback is therefore expediently output if the operator control element has an assigned long-press function but the operator control element has been, or is, operated only with a short press. To put it another way, an active haptic feedback is output when the operator control element has not been operated for long enough, e.g. has been operated for an operating time shorter than the minimum operating time.

In this scenario, the active haptic feedback may be output as soon as a predetermined (switching) threshold is no longer exceeded, with e.g. a finger of the user still being on the operator control element and thus being able to detect the active haptic feedback.

Furthermore, the active haptic feedback may be output as soon as the operator control element is operated and e.g. for the active haptic feedback during operation of the operator control element to be able to last until the minimum operating time is reached.

Output of the active haptic feedback in this scenario means that an event is brought about that the user can haptically perceive on the operator control element. This can optionally comprise the output of control signals to an actuator of the operator control element so that the actuator causes a haptically perceptible movement of the operator control element.

The control device described above affords a series of advantages. Among other things, an improved technique is provided that permits context-dependent provision of active haptic feedbacks. Based on the active haptic feedback, a user, e.g. the driver of the motor vehicle, is clearly informed, during operation of the operator control element, of whether the operator control element has an assigned long-press function, i.e. operation of the operator control element results in the initiation of a function connected to the operator control element only when the operator control element is operated for longer, e.g. at least a minimum operating time. To put it another way, the active haptic feedback provides the user with a preview indication that the operator control element needs to be operated again with a longer operating time in order to initiate the function, as the previous operation was too short.

Therefore, the disclosure affords the advantage that blind operability of the operator control element is improved, as the active haptic feedback provides the user with reliable information about non-acceptance of the input command because the operator control element has not been operated for long enough. Distractions for the user, e.g. the driver of the motor vehicle, are thus minimized because it is not necessary for them to avert their eyes, e.g. from the road to a display (or an indicator).

Additionally, the disclosure affords the advantage that an operator control unit having one or more operator control elements with a monolithic and/or seamless design can be provided and haptic feedbacks can still be provided and output to the user by way of the operator control element. This can increase degrees of freedom for the design of the operator control unit.

Furthermore, long-press functions today are virtually expert functions: it is necessary to know which button harbors a long press and which button does not. This is advantageously improved by the disclosure: even without this knowledge, the "preview" provides the information that the short-press function also harbors a long-press function. Exploration is thus facilitated and understanding of the system is improved, specifically without the need to read the instruction manual.

Possible developments of the control device described above are explained in detail hereinbelow.

The control device may be configured to activate the operator control element to output an active haptic short-press feedback if it has been determined that the operator control element has been operated with a short press and it has been determined that the operator control element has no assigned long-press function. The active haptic feedback and the active haptic short-press feedback may be different than one another. The prefix "short-press" is merely used to distinguish between the two active haptic feedbacks. To put it another way, the active haptic feedback and the active haptic short-press feedback are active haptic feedbacks that are different than one another.

The control device may be configured to activate the operator control element to output no active haptic feedback or an active haptic long-press feedback if it has been determined that the operator control element has been operated with a long press. The active haptic feedback and the active haptic long-press feedback may be different than one another. The prefix "long-press" is merely used to distinguish between the active haptic feedback and the active haptic long-press feedback (and the optional short-press feedback), which are active haptic feedbacks that are (may be) different than one another.

The operator control element may be operable in a first switching position and in a second switching position.

The control device may be configured to distinguish whether the operator control element is being (or has been) operated in the first switching position or in the second switching position if it has been determined that the operator control element has been operated with a short press or a long press.

The control device may be configured to activate the operator control element to output the active haptic feedback in such a way that a first active haptic feedback is output when the operator control element is operated in the first switching position and a second active haptic feedback is output when the operator control element is operated in the second switching position. To put it another way, (to activate the operator control element to output the active haptic feedback) the control device may be configured to activate the operator control element to output the first active haptic feedback if it has been determined that the operator control element is being operated in the first switching position, and to output the second active haptic feedback if it has been determined that the operator control element is being operated in the second switching position.

This affords the advantage that gradual operation of the operator control element allows multiple different long-press functions to be selected and a respective active haptic feedback to be used to indicate to the user that the operator control element has been operated, or held, in the respective switching position for too short a time to initiate the respective long-press function. Alternatively, there can be provision for more than two different switching positions and optionally more than two different active haptic feedback signals connected thereto.

The operator control element may be being operated in the first switching position as a result of a first switching threshold being exceeded and the operator control element may be being operated in the second switching position as a result of a second switching threshold being exceeded. The second switching threshold may be being exceeded in the event of an operating movement that may be in the same direction as and have a greater emphasis than an operating movement to exceed the first switching threshold. This allows multiple functions to be assigned to a single operator control element in a simple and intuitively controllable manner. The greater emphasis of the operating movement can consist in a greater operating force or can comprise a greater operating force. By way of example, if the operator control element is in the form of a pushbutton, the first switching threshold can be reached by pressing a first pushbutton and the second switching threshold can be reached by pressing a second pushbutton, which is larger than the first pushbutton.

The greater emphasis of the operating movement can consist in a greater operating force or can comprise a greater operating force.

For the purpose of distinction (of whether the operator control element is being operated in the first switching position or in the second switching position) the control device may be configured to determine that the operator control element is being operated in the first switching position if the first switching threshold is exceeded after a first return threshold has been exceeded. In other words, identification of operation of the operator control element in the first switching position can first require a first return threshold, which is situated below said first switching threshold, to be exceeded so that the exceeding of the first switching threshold is identified as an operating process. This can be accomplished as a result of the first return threshold and the first switching threshold being exceeded for the first time when the operator control element is operated, or as a result of operation of the operator control element having in the meantime been slackened, or softened, without completely interrupting operation, to the extent that operation has dropped below the first return threshold again.

For the purpose of distinction (of whether the operator control element is being operated in the first switching position or in the second switching position) the control device may be configured to determine that the operator control element is being operated in the second switching position if the second switching threshold has been exceeded after a second return threshold has been exceeded. In other words, identification of operation of the operator control element in the second switching position can first require a second return threshold, which is situated below said second switching threshold, to be exceeded so that the exceeding of the second switching threshold is identified as an operating process. This can be accomplished as a result of the second return threshold and the second switching threshold being exceeded for the first time when the operator control element is operated, or as a result of operation of the operator control element having in the meantime been slackened, or softened, to the extent that operation has dropped below the second return threshold again, without operation having been completely interrupted and without operation having dropped below the first return threshold again.

The first return threshold may be designed to be below the second return threshold and the second return threshold may be designed to be below the first switching threshold. In this context, "below" means that operation with less emphasis needs to take place, or that reaching the respective threshold requires a smaller operating force than reaching switching thresholds that are above this threshold.

An operating time for which the operator control element is operated in the first switching position can correspond to a length of time from a (first) time at which the first switching threshold is exceeded to a time at which the first return threshold is underrun (or alternatively a length of time for which the first switching threshold is exceeded). To put it another way, operation can begin as soon as the first switching threshold has been exceeded, and can end again as soon as the first switching threshold and then the first return threshold are underrun. Based on the operating time, it is possible to ascertain whether the operator control element is being operated in the first switching position with a short press or a long press.

Analogously, an operating time for which the operator control element is operated in the second switching position can correspond to a length of time from a (first) time at which the second switching threshold is exceeded to a time at which the second return threshold is underrun (or alternatively a length of time for which the second switching threshold is exceeded). To put it another way, operation can begin as soon as the second switching threshold has been exceeded, and can end again as soon as the second switching threshold and then the second return threshold are underrun. Based on the operating time, it is possible to ascertain whether the operator control element is being operated in the second switching position with a short press or a long press.

The first active haptic feedback and the second active haptic feedback may optionally be different than one another. This affords the advantage that, based on the haptic feedback and without a visual check, the user is provided with information about which switching position of the operator control element has an assigned long-press function if the operator control element has been operated, or held, in this switching position for too short a time.

What has been described above can be summarized in other words and for a possible more specific refinement of the disclosure as described hereinbelow, and the description that follows should not be interpreted as limiting the disclosure.

During a short press on an operator control element, e.g. a key, with long-press functionality, an active haptics element can be used to output a signal that distinguishes the operator control element with long-press functionality from an operator control element without long-press functionality.

The user can be informed about the availability of a long-press functionality. During a long press, it is possible to clearly communicate that a long-press function exists and is performed when the operator control element is held for longer.

For use in motor vehicles, distraction of the driver can be minimized in the best possible manner. The availability of a faster control option can be communicated to the user during use without this requiring them to avert their eyes. It becomes possible to find hidden functions that are useful but would otherwise have remained undiscovered.

Feedback about the long-press function can therefore be provided during the actual control. The problem of "letting go too early" is therefore reduced.

Furthermore, an active haptics operator control unit for a motor vehicle is provided, the active haptics operator control unit comprising an active haptics operator control element and the control device described above.

The active haptics operator control unit may comprise multiple active haptics operator control elements that can be activated using the control device.

The active haptics operator control unit (or the multiple active haptics operator control units) and the control device may be connected for signal transfer purposes.

The above description with reference to the control device also applies, mutatis mutandis, to the active haptics operator control unit, and vice versa.

Furthermore, a motor vehicle is provided, the motor vehicle comprising the active haptics operator control unit described above (and/or the control device described above).

The motor vehicle may be a passenger car, in particular an automobile, or a commercial vehicle, such as e.g. a truck.

The above description with reference to the control device and the active haptics operator control unit also applies, mutatis mutandis, to the motor vehicle, and vice versa.

Furthermore, a method for activating an active haptics operator control element for a motor vehicle is provided.

The method comprises determining whether the operator control element is being operated with a short press or a long press.

If it has been determined that the operator control element has been operated with a short press then the method comprises determining whether the operator control element has an assigned long-press function that is performable after the operator control element has been operated with a long press, and activating the operator control element to output an active haptic feedback if it has been determined that the operator control element has an assigned long-press function.

The (control) method may be a computer-implemented method, i.e. at least part of one, more or all of the steps of the method can be carried out by a computer, or a device for data processing, optionally the control device.

The above description with reference to the control device, the active haptics operator control unit and the motor vehicle also applies, mutatis mutandis, to the method, and vice versa.

Furthermore, a computer program comprising commands that, when the program is executed by a computer, cause said computer to carry out or perform at least part of the method described above is provided.

A program code of the computer program can be available in any code, in particular in a code suitable for controllers of motor vehicles.

The above description with reference to the control device, the active haptics operator control unit, the motor vehicle and the method also applies, mutatis mutandis, to the computer program, and vice versa.

Furthermore, a computer-readable medium, in particular a computer-readable storage medium, is provided. The computer-readable medium comprises commands that, when the commands are executed by a computer, cause said computer to carry out or perform at least part of the method described above.

That is to say that a computer-readable medium can be provided that comprises a computer program as defined above. The computer-readable medium may be any digital data storage unit, such as for example a USB stick, a hard disk, a CD-ROM, an SD card or an SSD card (or SSD drive/SSD hard disk).

The computer program does not necessarily have to be stored on such a computer-readable storage medium in order to be made available to the motor vehicle, but rather may also be obtained externally via the Internet or elsewhere.

The above description with reference to the method, the control device, the active haptics operator control unit, the computer program and the motor vehicle also applies, muta-tis mutandis, to the computer-readable medium, and vice versa.

It goes without saying that the features and embodiments mentioned above and explained below should not be con-sidered to be disclosed only in the particular explicitly mentioned combinations, but that other technically mean-ingful combinations and embodiments are also covered by the content of the disclosure.

Other objects, advantages and novel features of the pres-ent invention will become apparent from the following detailed description of one or more preferred embodiments when considered in conjunction with the accompanying drawings.

BRIEF DESCRIPTION OF THE DRAWINGS

In the figures, the same reference signs are used for identical or similar elements. Some of the descriptions of the figures specify reference signs even though the respective element may possibly be discernible only in other figures.

DETAILED DESCRIPTION OF THE DRAWINGS

Figure 1:
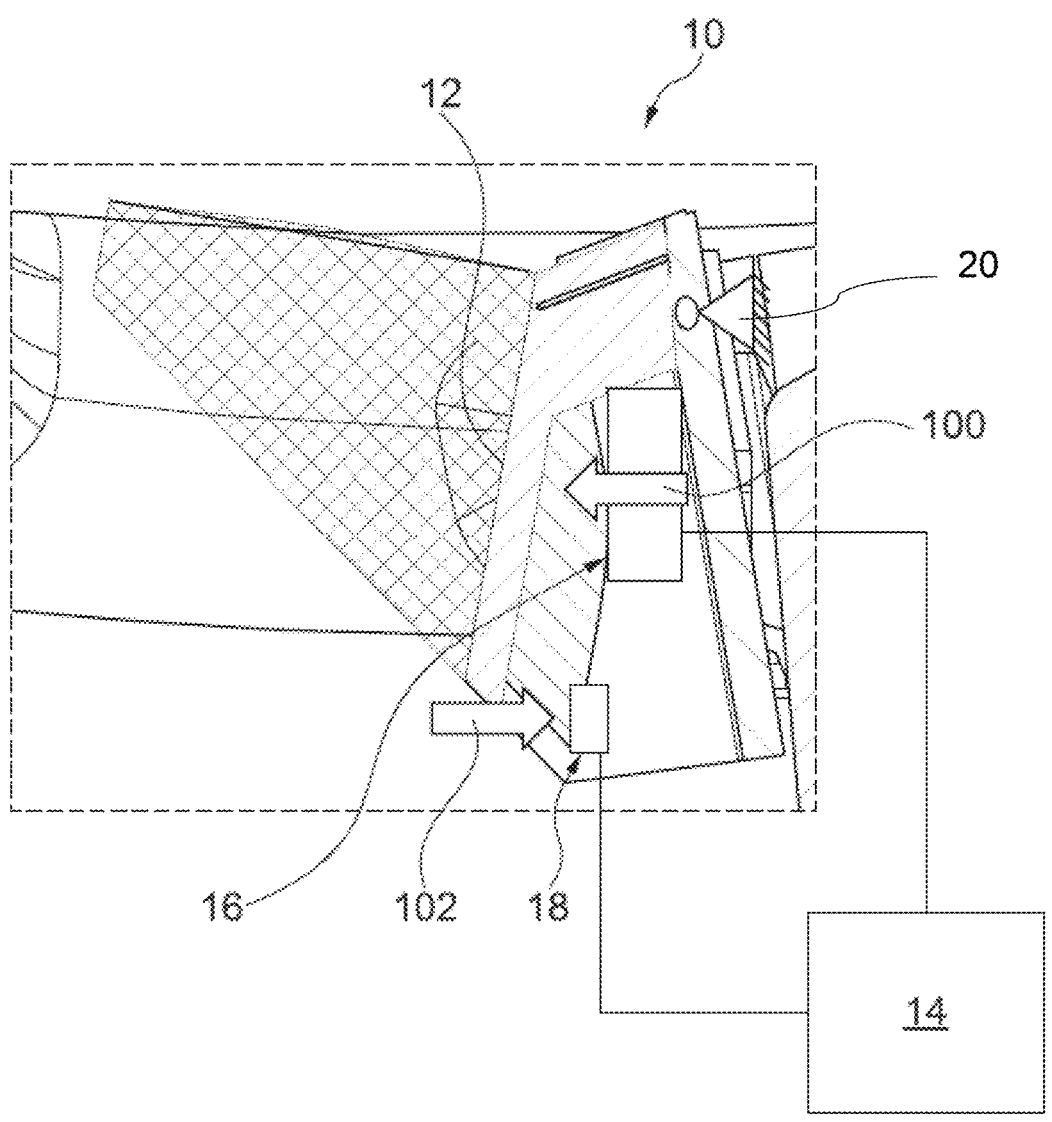
FIG. 1 is a schematic representation of an active haptics operator control unit according to an optional embodiment for a motor vehicle.

FIG. 1 is a schematic representation showing an active haptics operator control unit 10 according to an optional embodiment for a motor vehicle.

The active haptics operator control unit 10 comprises (at least) one active haptics operator control element 12 and also a control device 14 for activating the (at least one) active haptics operator control element 12.

The active haptics operator control unit 10 can have an actuator 16 and a force sensor 18. The actuator 16 may optionally be in the form of or comprise a moving coil actuator and be designed to mechanically influence the operator control element 12 in order to produce an active haptic feedback. Arrow 100 illustratively shows a direction of action of the actuator 16. The force sensor 18 may optionally be in the form of or comprise a piezoresistive force sensor and be designed to identify a user input on the operator control element 12, which is performed by way of a keystroke, for example, and to generate corresponding sensor signals. Arrow 102 illustratively shows a direction of the force acting when a user input is performed. Optionally, both the actuator 16 and the force sensor 18 are connected to the control device 14, and so the control device 14 can receive the sensor signals from the force sensor 18 and can control and/or regulate the actuator 16 to generate an active haptic feedback. The arrow 20 indicates the support point of the operator control element 12. According to other embodi-ments, the operator control element 12 may be configured differently and permit different operation. In particular, according to optional embodiments, a direction of action of the actuator may be in multiple directions, for instance in two spatial directions or in three spatial directions, including the direction in a plane of an operating surface of the operator control element 12.

Figure 2:
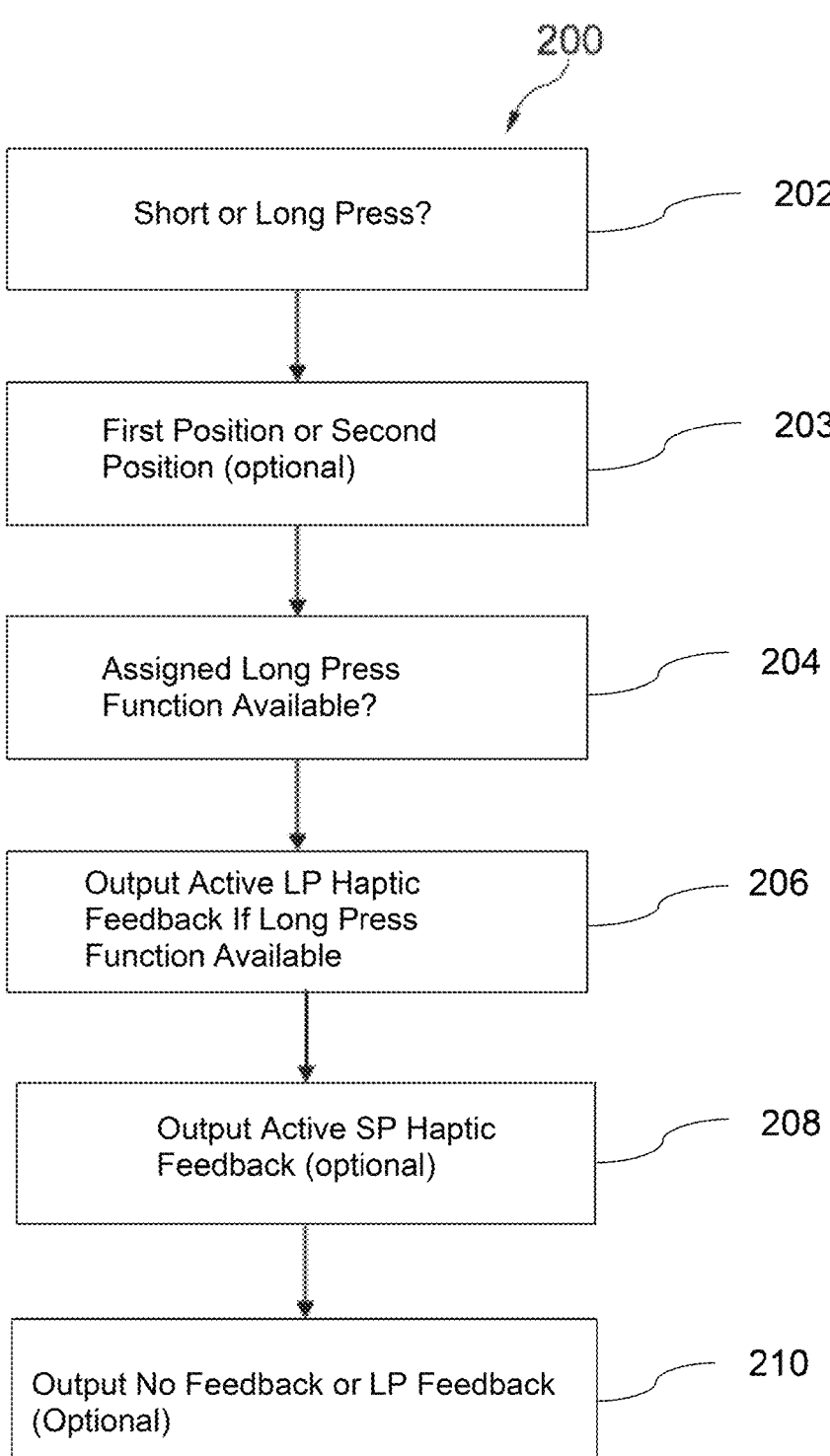
FIG. 2 is a flow chart of a method for activating an active haptics operator control element according to an optional embodiment.

To activate the active haptics operator control element 12, the control device 14 is configured to carry out the method 200, which is described in detail below also with reference to FIG. 2.

A first method step 202 comprises determining whether the operator control element 12 is being operated with a short press or a long press. This can be accomplished by determining operation of the operator control element and an operating time during the operation. If the determined oper-ating time is e.g. shorter than a predefined minimum oper-ating time, there is a short press, otherwise there is a long press.

Further method steps 204 and 206 (and optionally method step 208) are carried out if it has been determined that the operator control element 12 has been operated with a short press.

A second method step 204 comprises determining whether the operator control element 12 has an assigned long-press function that can be performed after the operator control element 12 has been operated with a long press.

A third method step 206 comprises activating the operator control element 12 to output an active haptic feedback 502 if it has been determined that the operator control element 12 has an assigned long-press function.

An optional fourth method step 208 can comprise acti-vating the operator control element 12 to output an active haptic short-press feedback 504 if it has been determined in the first method step 202 that the operator control element 12 has been operated with a short press and it has been determined in the second method step 204 that the operator control element 12 has no assigned long-press function, the active haptic feedback 502 and the active haptic short-press feedback 504 being different than one another.

Method steps 206 and 208 can be carried out in any order or simultaneously.

An optional fifth method step 210 can comprise activating the operator control element 12 to output no active haptic feedback or an active haptic long-press feedback if it has been determined in the first method step 202 that the operator control element 12 has been operated with a long press, the active haptic feedback 502 and the active haptic long-press feedback being different than one another. Method step 210 can be carried out as an alternative to method steps 204, 206 and 208.

Figure 3A:
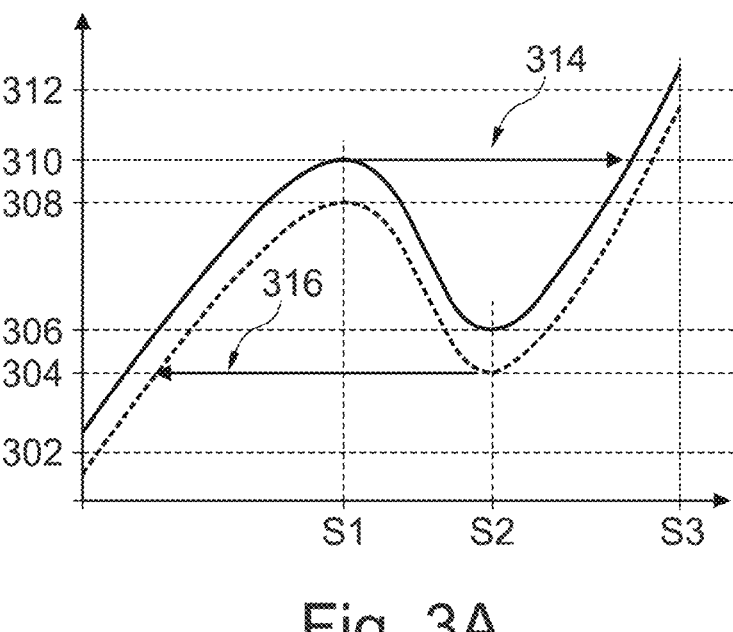
FIGS. 3A and 3B show a comparison of restoring force (vertical axis) against stroke (horizontal axis) for a conven-tional mechanical key with passive haptics (FIG. 3A) and the active haptics operator control element according to an optional embodiment (FIG. 3B)
Figure 3B:
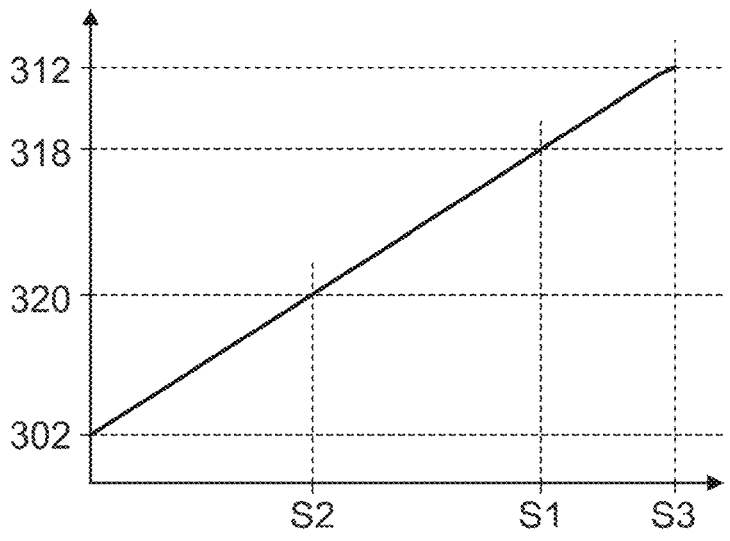

To explain the technological background, FIGS. 3A and 3B show a comparison of restoring force (vertical axis) against stroke (horizontal axis) for a conventional mechani-cal key with passive haptics (FIG. 3A) and an active haptics operator control element 12 according to an optional embodiment.

The horizontal assistive lines shown denote an initial stressing force 302, a return threshold 304, a snap 306, a return snap 308, a switching threshold 310 and a stop 312 for the case of the conventional mechanical key. The threshold values S1, S2 and S3 indicate when the switching threshold 310, the snap 306 and the stop 312 are reached. A snap can comprise a latching, or a latching movement. When the conventional key with passive haptics is operated, the finger "drops" into the switching point (indicated by arrow 314) when the switching threshold 310 is overcome. When the key is released, or relieved of pressure, by slackening the pressure on the key, the finger is pushed back, as indicated by arrow 316. This results in a haptic feedback being provided passively when the key is pressed and released, or relieved of pressure.

In contrast to the conventional mechanical key, the restoring force (vertical axis) in the case of an active haptics operator control element 12 can optionally have a linear response with the stroke (horizontal axis), as shown by way of illustration in FIG. 3B. To facilitate orientation, the assistive lines for the initial stressing force 302 and the stop 312 are shown in this instance, and also a switching threshold 318, the exceeding of which results in operation, or the beginning of operation, of the operator control element 12 being detected, and a return threshold 320 for providing an active haptic feedback when the return threshold 320 has been underrun after the switching threshold 318 has been exceeded and then underrun again. The effect that can be achieved by the linear response is that the exertion of force for operating the operator control element 12 can be perceived as linearly elastic.

Figure 4A:
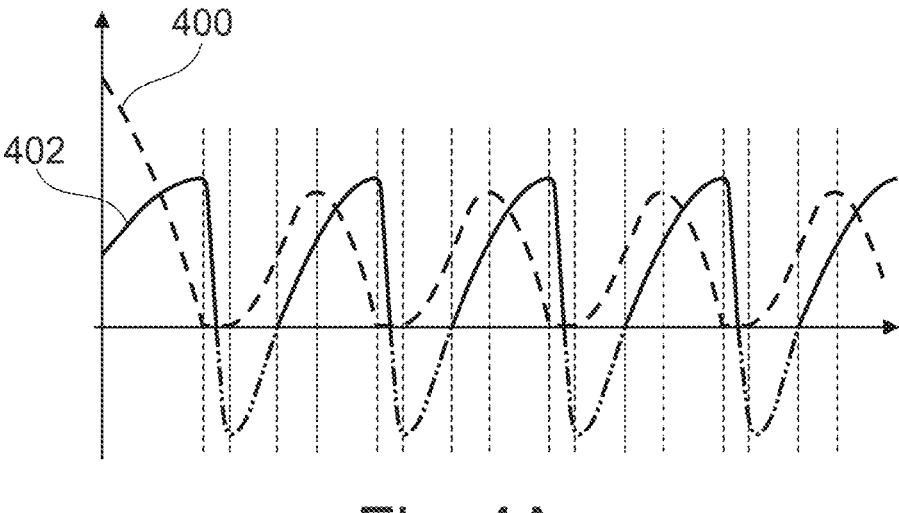
FIGS. 4A and 4B illustratively show a comparison for the time characteristic of finger travel and finger force during repeated operation of a conventional mechanical key (FIG. 4A) and the active haptics operator control unit according to an optional embodiment (FIG. 4B)
Figure 4B:
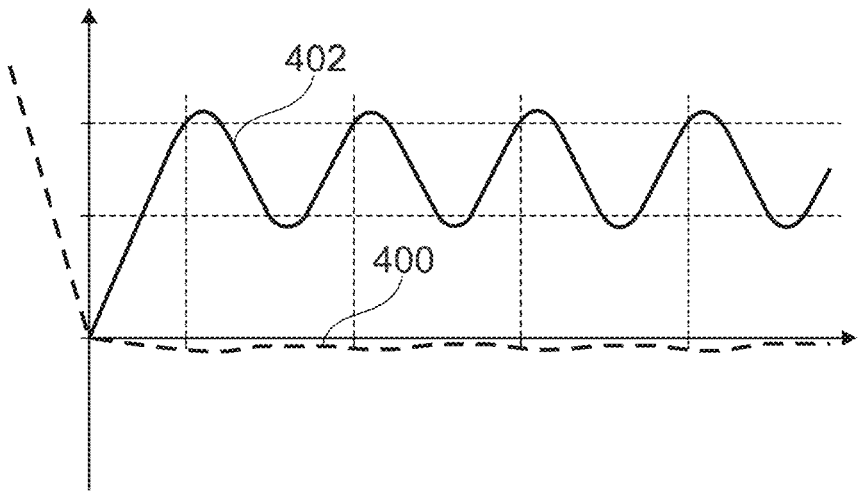

FIGS. 4A and 4B illustratively show a comparison for the time characteristic of finger travel 400 and finger force 402 during repeated operation of a conventional mechanical key (FIG. 4A) and an active haptics operator control unit 12 according to an optional embodiment (FIG. 4B). The assistive lines in this instance indicate switching thresholds, return thresholds and switching processes. It can be seen that an active haptics operator control element 12 can be used to accomplish the repeated operation of the active haptics operator control element 12 with a much shorter finger travel, or finger stroke, than in the case of a conventional mechanical key.

The operator control element 12 shown in FIG. 1 may optionally be operable in a first switching position and in a second switching position. If this is the case, an optional method step 203 of the method 200 (in FIG. 2) can comprise distinguishing whether the operator control element 12 is being, or has been, operated in the first switching position or in the second switching position if it has been determined that the operator control element 12 has been operated with a short press or a long press.

To distinguish between the two switching positions, the active haptic feedback 502 can comprise a first active haptic feedback 502a if the operator control element 12 is being operated in the first switching position and a second active haptic feedback 502b if the operator control element 12 is being operated in the second switching position. The operator control element 12 can therefore be activated in the third method step 206 to output the first active haptic feedback 502a if it has been determined that the operator control element 12 is being operated in the first switching position, or to output the second active haptic feedback 502b if it has been determined that the operator control element 12 is being operated in the second switching position.

The operator control element 12 may be being operated in the first switching position as a result of a first switching threshold 318a being exceeded and the operator control element may be being operated in the second switching position as a result of a second switching threshold 318b being exceeded, the second switching threshold 318b being exceeded in the event of an operating movement that is in the same direction as and has a greater emphasis than an operating movement to exceed the first switching threshold 318a. The greater emphasis of the operating movement can consist in a greater operating force or can comprise a greater operating force.

Operation of the operator control element 12 in the first switching position or in the second switching position can be distinguished as a result of it being possible to determine that the operator control element 12 is being operated in the first switching position if the first switching threshold 318a is exceeded after a first return threshold 320a has been exceeded, and it being possible to determine that the operator control element 12 is being operated in the second switching position if the second switching threshold 318b has been exceeded after a second return threshold 320b has been exceeded. The first return threshold 320a may be designed to be below the second return threshold 320b and the second return threshold 320b may be designed to be below the first switching threshold 318a.

Figure 5A:
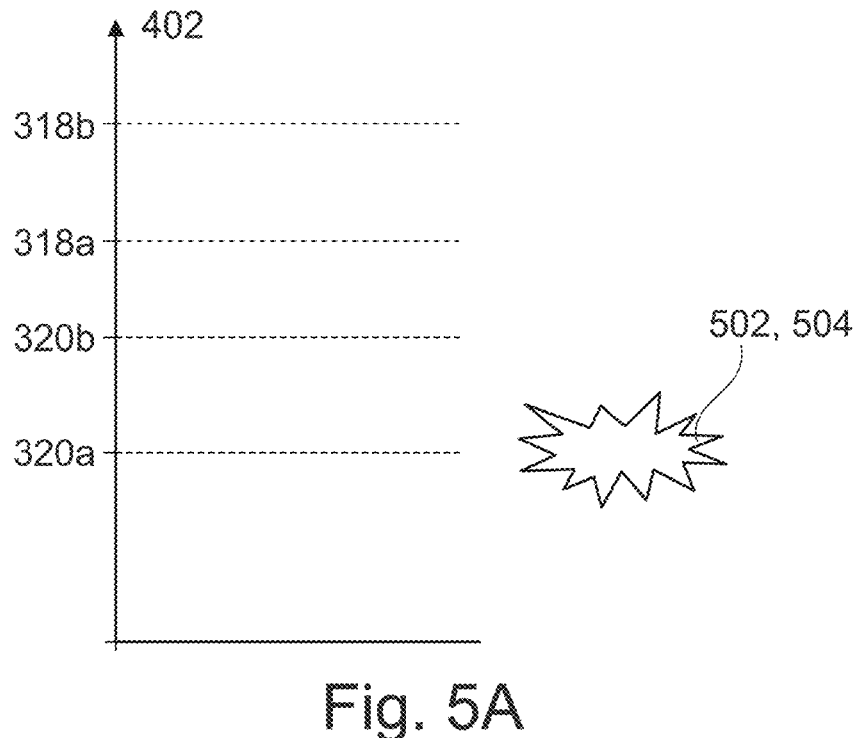
FIG. 5A schematically shows the relative arrangement of the first and second switching thresholds and the first and second return thresholds in a graph that represents finger force on the vertical axis.

FIG. 5A schematically shows the relative arrangement of the first and second switching thresholds 318a, 318b and the first and second return thresholds 320a and 320b in a graph that represents finger force 402 on the vertical axis. Output of the active haptic feedback 502 and optional output of the active haptic short-press feedback 504 are indicated on the right in FIG. 5A.

The active haptic feedback 502 or the active haptic short-press feedback 504 can be output e.g. as soon as the first switching threshold 318a has been exceeded and underrun again and then the first return threshold 320a has also been underrun. An operating time can correspond to a period of time from the first switching threshold 318a being exceeded to the first return threshold 320a being underrun. Based on the operating time, it is possible to tell whether the operator control element 12 has been operated with a short press or a long press. If there is a short press, an active haptic feedback 502 can be output if the operator control element 12 has an assigned long-press function, or an active haptic short-press feedback 504 can be output if the operator control element 12 has no assigned long-press function.

As an alternative to the active haptic feedback 502, which is output only when the active haptics operator control element 12 has been operated and the first return threshold 320a has been underrun again, there may also be provision for the active haptic feedback to be output just as soon as the first switching threshold 318a is exceeded, i.e. as soon as the active haptics operator control element 12 is operated. In this scenario, it is conceivable for the active haptic feedback to last until the minimum operating time is reached and/or operation of the active haptics operator control element 12 has been completed as a result of the first switching threshold 318a and the first return threshold 320a being underrun. In this case, the operating time is ascertained while the active haptics operator control element 12 is actually being operated, in order to establish whether the current operation is operation with a short press if the minimum operating time has not yet been reached.

Figure 5B:
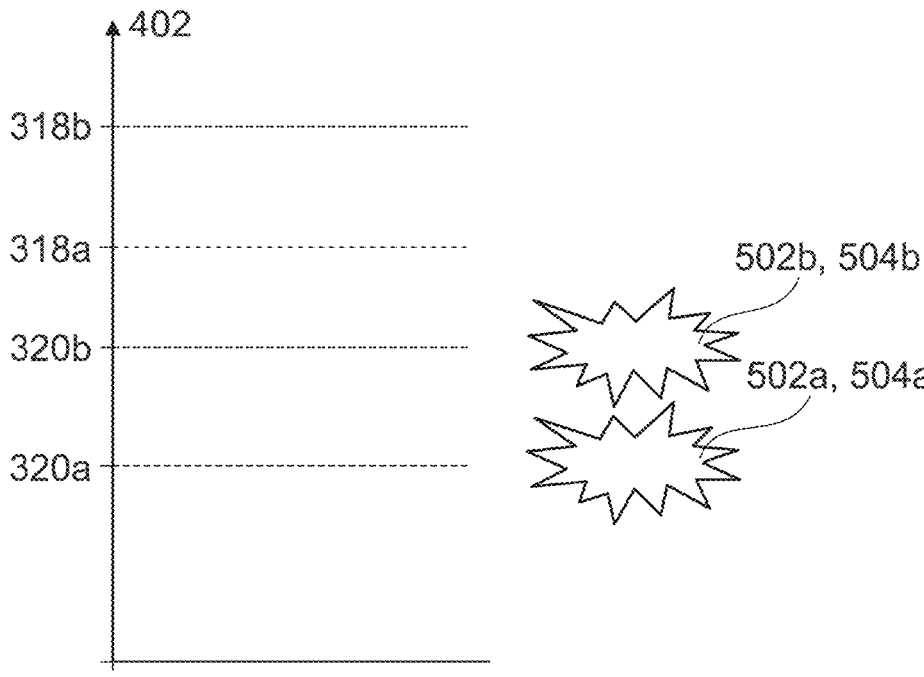
FIG. 5B shows a case in which the first switching position and the second switching position of the active haptics operator control element are distinguished by separate active haptic feedbacks.

FIG. 5B shows a case in which the first switching position and the second switching position of the active haptics operator control element 12 are distinguished by separate active haptic feedbacks. In this instance, the first active haptic feedback 502a or the optional active haptic short-press feedback 504a is output when the first switching threshold 318a is exceeded, and the second active haptic feedback 502b or the optional active haptic short-press feedback 504b is output when the second switching threshold 318b is exceeded. The first active haptic feedback 502a and the second active haptic feedback 502b, and optionally the first active haptic short-press feedback 504a and the second active haptic short-press feedback 504b, may be different than one another in this instance.

The first active haptic feedback 502a, or the first active haptic short-press feedback 504a, can be output analogously to the feedbacks 502, 504 in FIG. 5A. The second active haptic feedback 502b or the second active haptic short-press feedback 504b can be output e.g. as soon as the second switching threshold 318b has been exceeded and underrun again and then the second return threshold 320b has also been underrun. An operating time can correspond to a period of time from the second switching threshold 318b being exceeded to the second return threshold 320b being underrun. Based on the operating time, it is accordingly possible to tell whether the operator control element 12 has been operated with a short press or a long press. If there is a short press, a second active haptic feedback 502b can be output if the operator control element 12 has an assigned long-press function, or a second active haptic short-press feedback 504b can be output if the operator control element 12 has no assigned long-press function.

As an alternative to the first active haptic feedback 502a and the second active haptic feedback 502b, which are output only when the active haptics operator control element 12 has been operated and the first return threshold 320a, or the second return threshold 320b, has been underrun again, there may also be provision here for the active haptic feedbacks to be output just as soon as the active haptics operator control element 12 is operated in the first switching position, or in the second switching position. The first active haptic feedback can therefore be output as soon as the first switching threshold 318a is exceeded, and the second active haptic feedback can be output as soon as the second switching threshold 318b is exceeded. In this scenario, it is likewise conceivable for the first active haptic feedback, or the second active haptic feedback, to last until the respective minimum operating time is reached and/or operation of the active haptics operator control element 12 has been completed as a result of the first switching threshold 318a and the first return threshold 320a (for the first switching position) being underrun, or as a result of the second switching threshold 318b and the first return threshold 320b (for the second switching position) being underrun. The operating time is therefore ascertained while the active haptics operator control element 12 is actually being operated, in order to establish whether the current operation is operation with a short press if the respective minimum operating time has not yet been reached.

Figure 6:
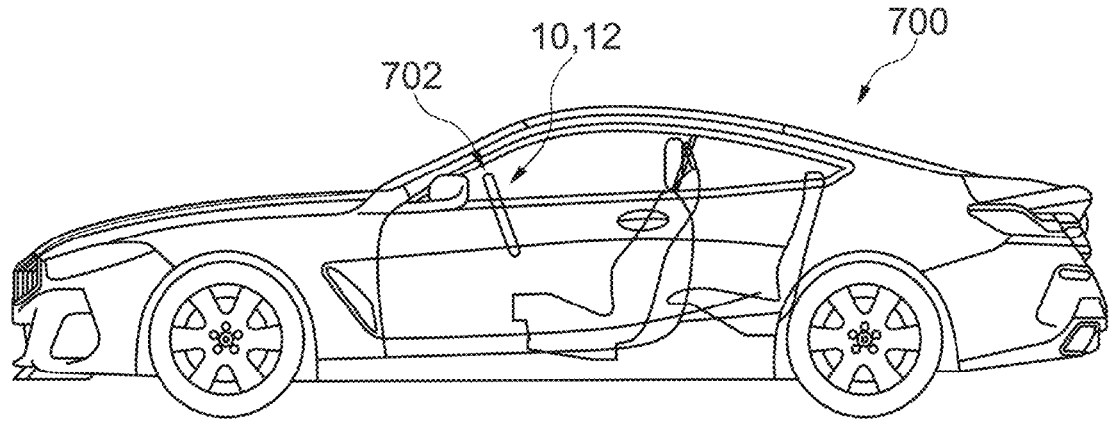
FIG. 6 illustratively shows a motor vehicle according to an optional embodiment.

FIG. 6 illustratively shows the motor vehicle 700 with a steering wheel 702, the steering wheel 702 having the operator control unit 10 with the (at least one) operator control element 12 according to the disclosure.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

LIST OF REFERENCE SIGNS 10 operator control unit
12 active haptics operator control element 14 control device
16 actuator
18 force sensor
20 support point
100 direction of action of the actuator
102 direction of force of the user input
200 method for activating the active haptics operator control element
202-210 method steps
302 initial stressing force
304 return threshold
306 snap
308 return snap
310 switching threshold
312 stop
314 drop into switching point
316 finger pushed back
318 switching threshold (for beginning of operation)
318a first switching threshold
318b second switching threshold
320 return threshold
320a first return threshold
320b second return threshold
400 finger travel
402 finger force
502 active haptic feedback
502a first active haptic feedback
502b second active haptic feedback
504 active haptic short-press feedback
504a first active haptic short-press feedback
504b second active haptic short-press feedback
700 motor vehicle
702 steering wheel

What is claimed is:

1. A device for activating an active haptics operator control element for a motor vehicle, comprising:
   a control device operatively configured to:
      determine whether the operator control element is being operated with a short press or a long press;
      when it has been determined that the operator control element has been operated with a short press, to:
         determine whether the operator control element has an assigned long-press function that is performable after the operator control element has been operated with a long press; and
         activate the operator control element to output a first of two or more active haptic feedback signals when it has been determined that the operator control element has an assigned long-press function; and
         activate the operator control element to output a second of the two or more active haptic feedback signals when it has been determined that the operator control element has no assigned long-press function.

2. The device according to claim 1, wherein:
   the second of the two or more active haptic feedback signals comprises an active haptic short-press feedback,
   the active haptic feedback and the active haptic short-press feedback being different than one another.

3. The device according to claim 1, wherein the control device is further configured to:
   activate the operator control element to output no active haptic feedback or an active haptic long-press feedback when it has been determined that the operator control element has been operated with a long press, the active haptic feedback and the active haptic long-press feedback being different than one another.

4. The device according to claim 1, wherein the operator control element is operable in a first switching position and in a second switching position, the control device being further configured to:

distinguish whether the operator control element is being operated in the first switching position or in the second switching position when it has been determined that the operator control element has been operated with a short press or a long press, and activate the operator control element to output the active haptic feedback such that a first active haptic feedback is output when the operator control element is operated in the first switching position and a second active haptic feedback is output when the operator control element is operated in the second switching position.

5. The device according to claim 4, wherein the operator control element is operated in the first switching position as a result of a first switching threshold being exceeded and the operator control element is operated in the second switching position as a result of a second switching threshold being exceeded, the second switching threshold is exceeded in the event of an operating movement that is in the same direction as and has a greater emphasis than an operating movement to exceed the first switching threshold.

6. The device according to claim 5, wherein the greater emphasis of the operating movement comprises a greater operating force.

7. The device according to claim 4, wherein the control device is further configured to:

determine that the operator control element is being operated in the first switching position when the first switching threshold is exceeded after a first return threshold has been exceeded; and determine that the operator control element is being operated in the second switching position when the second switching threshold has been exceeded after a second return threshold has been exceeded, and the first return threshold is designed to be below the second return threshold and the second return threshold is designed to be below the first switching threshold.

8. An active haptics operator control unit for a motor vehicle, comprising:

the device according to claim 1; and the active haptics operator control element.

9. A motor vehicle comprising an active haptics operator control unit according to claim 8.

10. A method for activating an active haptics operator control element for a motor vehicle, the method comprising:

determining whether the operator control element is being operated with a short press or a long press;

when it has been determined that the operator control element has been operated with a short press, then:

determining whether the operator control element has an assigned long-press function that is performable after the operator control element has been operated with a long press;

activating the operator control element to output a first of two or more active haptic feedback signals when it has been determined that the operator control element has an assigned long-press function; and activating the operator control element to output a second of the two or more active haptic feedback signals when it has been determined that the operator control element has no assigned long-press function.

\* \* \* \* \*